United States Patent
Saenger

(10) Patent No.: US 9,796,047 B2
(45) Date of Patent: Oct. 24, 2017

(54) REMOTE LASER HEATING SYSTEMS AND METHODS

(71) Applicant: Schlumberger Technology Corporation, Sugar land, TX (US)

(72) Inventor: Richard Saenger, Chatillon (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 141 days.

(21) Appl. No.: 14/768,448

(22) PCT Filed: Feb. 25, 2014

(86) PCT No.: PCT/US2014/018131
§ 371 (c)(1),
(2) Date: Aug. 17, 2015

(87) PCT Pub. No.: WO2014/133984
PCT Pub. Date: Sep. 4, 2014

(65) Prior Publication Data
US 2016/0001400 A1 Jan. 7, 2016

(30) Foreign Application Priority Data
Feb. 28, 2013 (EP) .................... 13305233

(51) Int. Cl.
*B23K 26/122* (2014.01)
*B23K 26/21* (2014.01)
(Continued)

(52) U.S. Cl.
CPC .......... *B23K 26/122* (2013.01); *B23K 26/128* (2013.01); *B23K 26/1224* (2015.10);
(Continued)

(58) Field of Classification Search
CPC ............................. B23K 26/122; B23K 26/21
(Continued)

(56) References Cited

U.S. PATENT DOCUMENTS 5,916,464 A * 6/1999 Geiger ................. B23K 9/1336
219/130.4
6,238,847 B1 * 5/2001 Axtell, III .............. B41M 5/262
427/555
(Continued)

FOREIGN PATENT DOCUMENTS

EP 2106874 10/2009

OTHER PUBLICATIONS

"Transmission of pulsed CO2 laser beams through opaque liquids by a cavitation effect," Applied Physics Letters, AIP, American Institute of Physics, Melville, NY, US, vol. 70, No. 18, May 5, 1997, pp. 2362-2364.
(Continued)

*Primary Examiner* — Samuel M Heinrich
(74) *Attorney, Agent, or Firm* — Michael Dae

(57) ABSTRACT

Systems and methods are provided for laser heating in a fluid environment (30). Such a system may include a laser generator (12) and a laser output sub (16) separate from one another via an optical fiber (18). The laser generator may generate a heating laser pulse over the optical fiber. The laser output sub may emit the heating laser pulse to heat a substrate (22) in the fluid environment (30). To enable the heating laser pulse to pass between the laser output sub (16) and the substrate (22), the laser output sub may dispense a laser-transmissive optical grease or a laser-transmissive magnetic fluid, or may generate a vacuum cavitation bubble in the fluid between the laser output sub (16) and the substrate (22).

8 Claims, 9 Drawing Sheets

(51) Int. Cl.
*B23K 26/12* (2014.01)
*E21B 43/11* (2006.01)
*E21B 43/119* (2006.01)
*E21B 47/12* (2012.01)
*B23K 26/211* (2014.01)

(52) U.S. Cl.
CPC ............ *B23K 26/21* (2015.10); *B23K 26/211* (2015.10); *E21B 43/11* (2013.01); *E21B 43/1195* (2013.01); *E21B 47/123* (2013.01)

(58) Field of Classification Search
USPC .............. 219/121.6, 121.63–121.72, 121.76, 219/121.77, 121.84, 121.85
See application file for complete search history.

(56) References Cited

U.S. PATENT DOCUMENTS

2005/0259702 A1* 11/2005 Kubota .................. G11B 7/127
372/34
2009/0126235 A1  5/2009 Kobayashi et al.
2009/0261086 A1* 10/2009 Beer ...................... G01N 25/00
219/383

OTHER PUBLICATIONS

M.A. Margulis, "Sonochemistry and Caviation," Gordon and Breach Publishers, ISBN 2-88124-849-7.

* cited by examiner

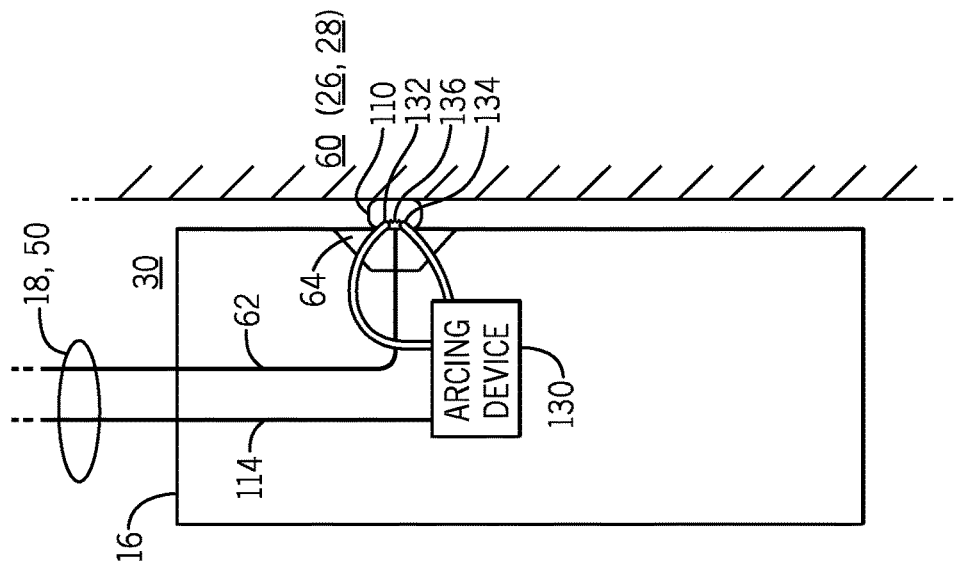
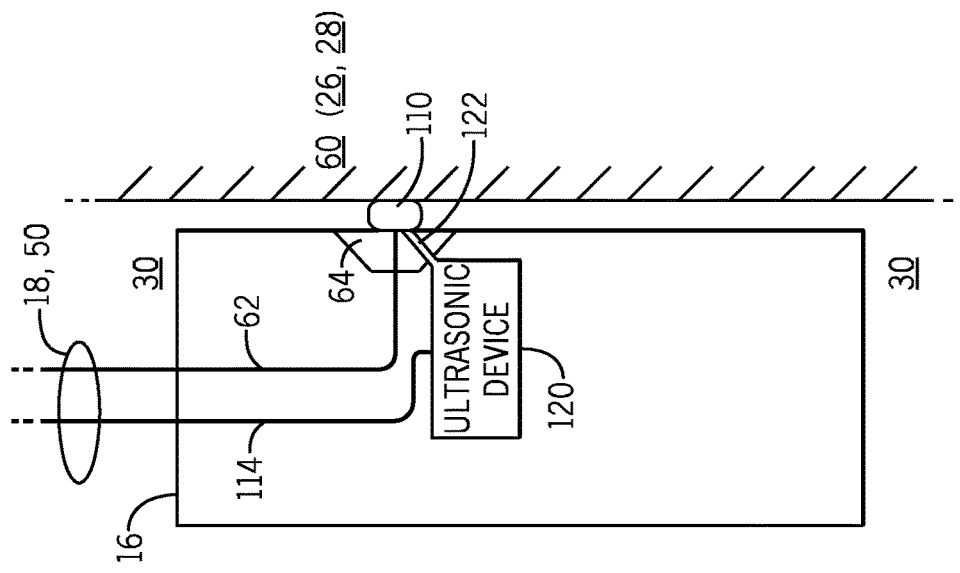
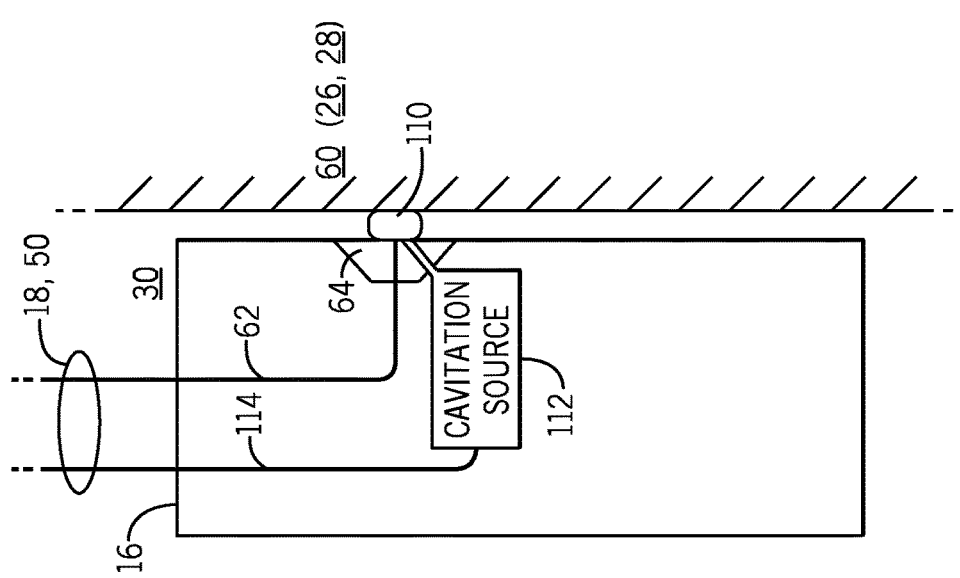

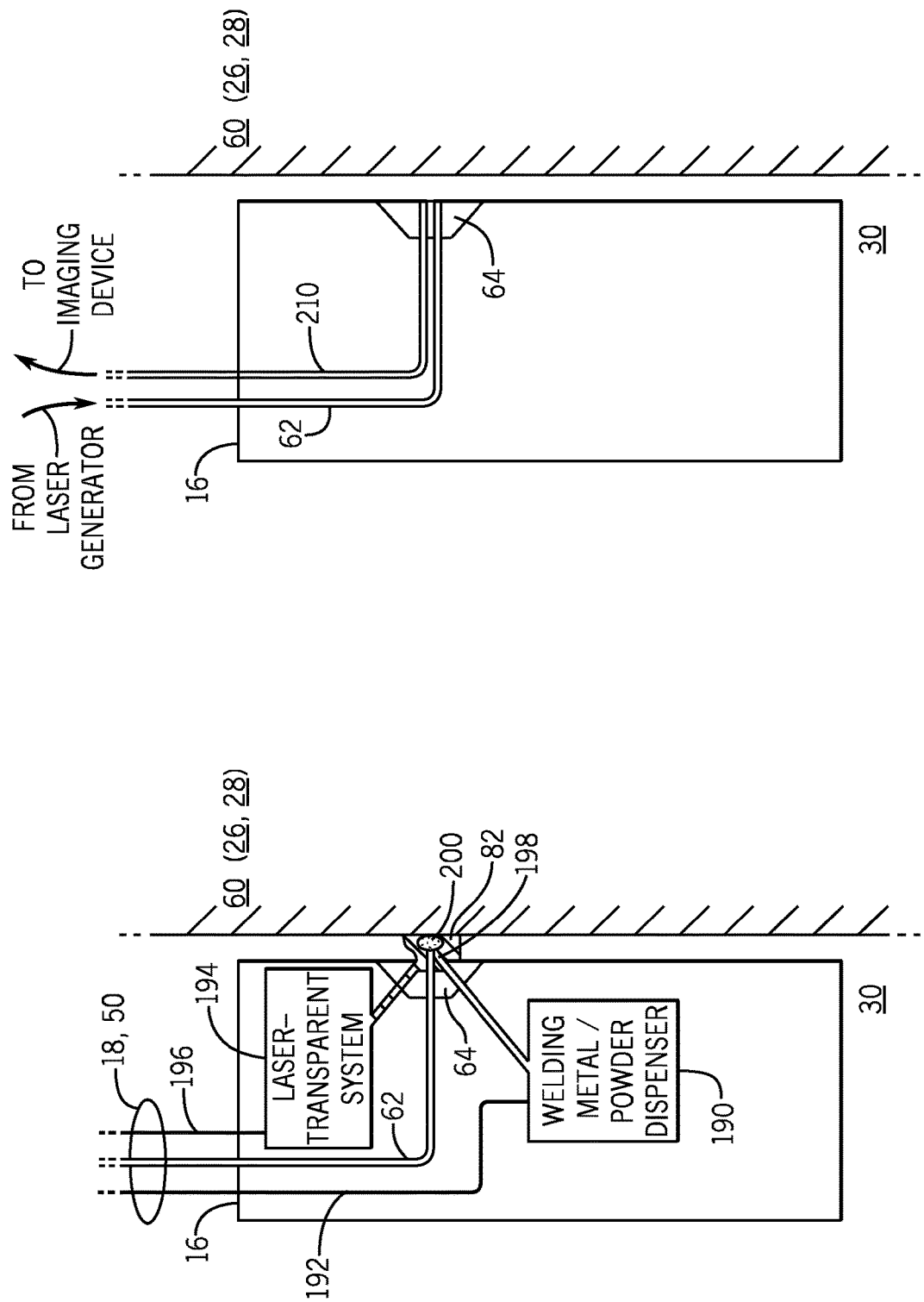

REMOTE LASER HEATING SYSTEMS AND METHODS

BACKGROUND

This disclosure relates to remote laser heating in fluid and/or extreme environments.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In fluid and/or extreme environments, such as in a well or a nuclear power plant, construction, repairs, and other similar operations may be difficult. For example, to perforate a well, an operator may employ explosive devices that involve a special license. Moreover, some fluid and/or extreme environments may be difficult for a human to access. For instance, a human may not be able to enter certain areas of a nuclear power plant or fit inside a wellbore of a hydrocarbon well.

To weld or cut materials in these remote, difficult-to-reach locations, a variety of systems have been developed. In one example, a remote operated vehicle (ROV) may robotically weld and/or cut materials under water. These ROVs, however, may be unable to fit in certain narrow spaces. Laser welding and/or cutting systems may also have been developed that are intended to enable laser welding and/or laser cutting in a fluid-filled well. Yet such laser welding systems may have many drawbacks. These systems may use laser pulses generated at a large distance from the location that is to be operated on, potentially causing the laser pulses to attenuate before reaching its target substrate. In addition, because well fluids (e.g., drilling mud or hydrocarbons) locally surrounding such laser welding and/or cutting systems may not be transparent, these systems have been described to use certain fluid displacement media to push away the well fluids. These described fluid displacement media, however, are believed not to easily remain in place. As a result, it is believed the well fluids may be more likely to intersect the laser pulse from the laser welding system and the substrate. In addition, a supply of the fluid displacement media may be used to be stored inside of such laser welding systems; when the supply of fluid displacement media has been drained, the laser welding system may be unable to continue operating.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to systems and methods for laser heating in a fluid environment for cutting, welding, perforating, and so forth. In one embodiment, a system may include a laser generator and a laser output sub separate from one another and connected via an optical fiber. The laser generator may generate a heating laser pulse over the optical fiber. The laser output sub may emit the heating laser pulse to heat a substrate in the fluid environment. To enable the heating laser pulse to pass between the laser output sub and the substrate, the laser output sub may dispense a laser-transmissive optical grease or a laser-transmissive magnetic fluid, or may generate a vacuum cavitation bubble in the fluid between the laser output sub and the substrate.

In another example, a method for laser heating in a fluid environment includes disposing a laser output sub into the fluid environment adjacent to a substrate and generating a vacuum cavitation bubble in the fluid environment between the laser output sub and the substrate. A heating laser pulse may be emitted from the laser output sub toward the substrate through the vacuum cavitation bubble to heat the substrate.

In another example, a system for laser heating in a well includes a surface power supply, a first conveyance cable, a laser generation sub, a second conveyance cable containing a first optical fiber, and a laser output sub. The surface power supply device may supply power from a surface location of the well. The first conveyance cable may convey the power to the laser generation sub. The laser generation sub may be placed into the well and may generate a heating laser pulse over the first optical fiber. The laser output sub may connect to the laser generation sub via the second conveyance cable, and may displace well fluid in an area of displacement between the laser output sub and a substrate as well as to emit the heating laser through the area of displacement to heat the substrate.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 7 is a schematic diagram of a laser output sub that uses a cavitation source to generate a vacuum cavitation bubble in the downhole fluid to enable the laser to reach the substrate, in accordance with an embodiment;

FIG. 8 is a schematic diagram of a laser output sub that employs an ultrasonic device to generate a vacuum cavitation bubble with an ultrasonic pulse, in accordance with an embodiment;

FIG. 9 is a schematic diagram of a laser output sub that employs an electrical arcing device to generate a vacuum cavitation bubble with an electrical arc, in accordance with an embodiment;

FIG. 16 is a schematic diagram of a laser heating system that includes a metal or powder dispenser, in accordance with an embodiment;

FIG. 17 is a schematic diagram of a laser output sub that includes an optical fiber to transmit images to an imaging device to enable a laser heating operation to be monitored, in accordance with an embodiment;

DETAILED DESCRIPTION

Figure 2:
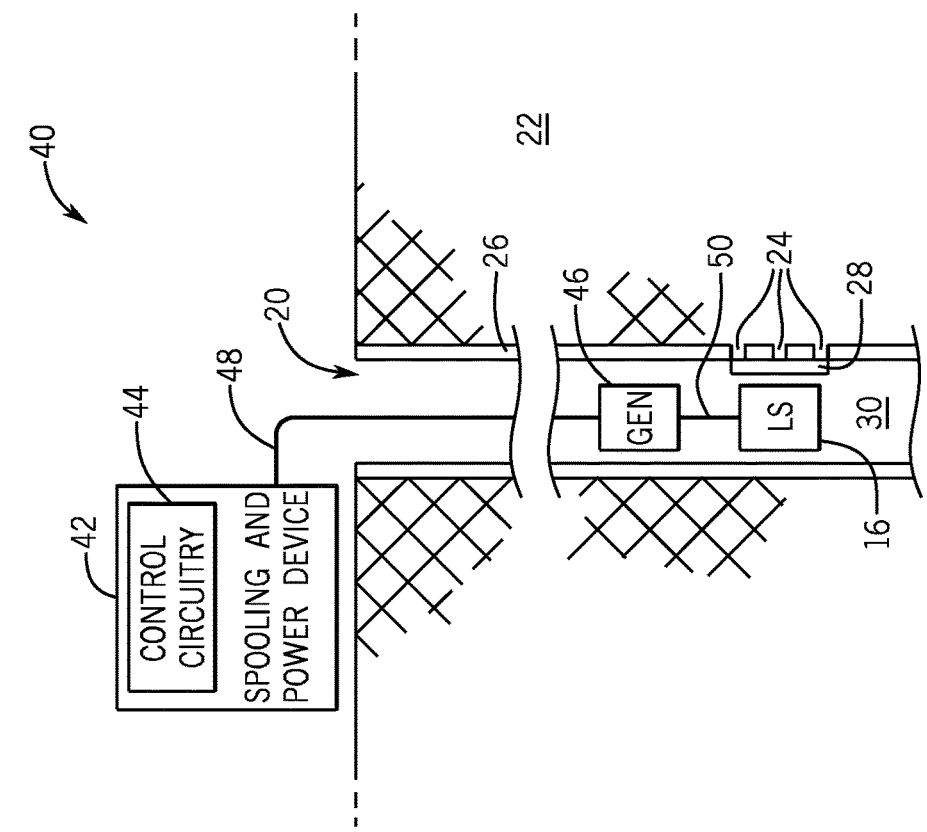
FIG. 2 is a schematic diagram of a laser heating system for remotely heating a substrate in a wellbore using a laser generated in a downhole laser generation sub and provided to a downhole laser output sub via an optical fiber, in accordance with embodiments.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of this disclosure relate to a laser heating system that can be used in extreme and/or fluid environments. As used herein, the term "laser heating system" refers to a system that can perform operations that rely on heat caused by laser radiation. Such laser heating operations may include welding, cutting, and perforating, but may also include any other suitable laser heating operations. Indeed, the laser heating system of this disclosure may also serve as a heating source to seal connections downhole or to activate shape memory alloys, to name a few examples. Among other things, the use of lasers permits very high "instantaneous" temperature spots. By displacing the laser spots, the heat generated can be used to perforate, weld, or even clean metals or other materials, such as casings made of plastic and patches to seal off leaking casings. The extreme and/or fluid environments in which the laser heating system can be used may represent extreme chemical environments or environments of extreme temperature or pressure. Such environments may include, for example, a well (e.g., a hydrocarbon well) or areas of a nuclear power plant inaccessible to humans.

As will be discussed below, the laser heating system of this disclosure may include a laser output sub that is separate from a laser generating device. When used to perform downhole laser heating operations, the laser generating device may be located at the surface or in a separate laser generation sub. An optical fiber or bundles of optical fibers may carry the laser to the laser output sub. When the laser is generated at the surface, the laser beam may attenuate while traveling great distances. As such, generating the laser in the laser generation sub may permit laser heating at greater depths in some embodiments. Whether generated at the surface or in a downhole laser generation sub, the laser pulse provided over the optical fiber to the laser output sub may be emitted by the laser output sub onto a substrate. The energy of the laser pulse on the substrate may heat the substrate. In this way, the laser output sub may weld, cut, perforate, clean, activate, vaporize, or perform other laser heating operations on downhole materials (e.g. casing, tubing, rock formation, casing seals, and so forth).

The well fluid in the wellbore, however, may include hydrocarbons, drilling mud, or brines, which may be relatively dark. Therefore, the well fluid may absorb some of the energy of the laser pulse unless first displaced. To this end, the laser output sub may output a laser-transmissive medium such as optical grease or a magnetic fluid. Additionally or alternatively, the laser output sub may cause a vacuum cavitation bubble to form in the well fluid, creating a vacuum through which the laser pulse may travel toward the substrate. The vacuum cavitation bubbles may be formed using any cavitation-creating system or device. For example, an ultrasonic device or an electrical arcing device may generate the vacuum cavitation bubbles. Additionally or alternatively, a first, cavitation-causing laser pulse may cause a vacuum cavitation bubble to form before a second, heating laser pulse. The heating laser pulse may travel through the vacuum cavitation bubble to reach the substrate. The cavitation-causing laser pulse may be provided by the same or a different laser than the laser that provides the heating laser pulse.

Figure 1:
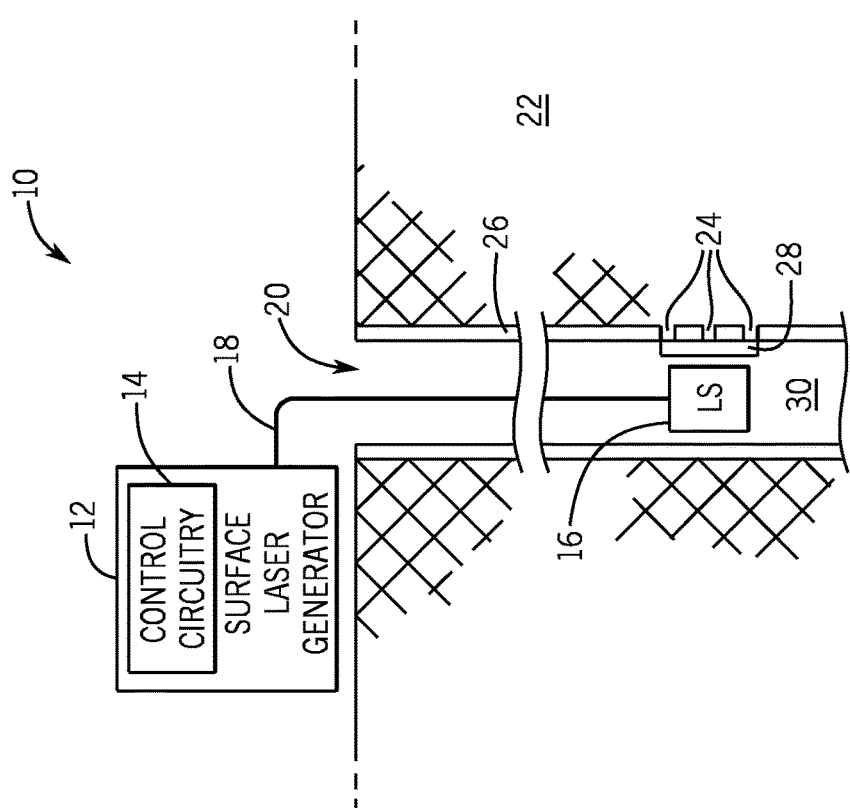
FIG. 1 is a schematic diagram of a laser heating system for remotely heating a substrate in a wellbore using a laser generated at the surface and provided to a downhole laser output sub via an optical fiber, in accordance with embodiments.

With the foregoing in mind, FIG. 1 illustrates a first laser heating system 10. A surface laser generator 12, which includes control circuitry 14, may generate and provide laser pulses to a laser output sub (LS) 16 via an optical fiber or bundle of optical fibers contained in a conveyance cable 18. The conveyance cable 18 may provide support, electrical power, and/or control signals in addition to the optical fiber or bundle of optical fibers to the laser output sub 16. In the example of FIG. 1, the laser output sub 16 has been lowered into a wellbore 20 drilled into a subterranean formation 22. Perforations 24 in a well casing 26 of the wellbore 20 previously may have been removed to produce oil and gas from a specific depth in the formation 22. In the example of FIG. 1, the perforations 24 are no longer producing sufficient oil and gas, but instead are producing water. As such, the laser output sub 16 may be used to weld a seal 28 over the perforations 24 in the casing 26.

The laser output sub 16 may use optical grease or a magnetic fluid to displace well fluid 30 in the wellbore 20. Additionally or alternatively, the laser output sub 16 may generate vacuum cavitation bubbles in the well fluid 30. The laser output sub may emit heating laser pulses through the optical grease, magnetic fluid, or vacuum cavitation bubbles to weld the seal 28. Although the example of FIG. 1 illustrates the use of the laser output sub 16 for welding, the laser output sub 16 may additionally or alternatively be used to cut, perforate, heat, activate, or perform any other suitable laser heating operations on any suitable substrate.

The surface laser generator 12 may generate a laser of any suitable wavelength of any suitable amount of power to perform the desired laser heating operation in the laser output sub 16. For example, an Ytterbium laser emitting at 1070 nm may provide relatively low optical losses when transmitted over the optical fiber or bundle of fibers contained in the conveyance cable 18. Indeed, the laser pulses output by the surface laser generator 12 may travel up to a few thousand meters over the optical fiber or bundle of optical fibers contained in the conveyance cable 18. In some embodiments, the surface laser generator 12 may generate laser pulses of a few kilowatts of power. In one embodiment, the laser pulses may be of approximately one kilowatt.

In some embodiments, the surface laser generator 12 also may include an imaging device that can observe images provided over an optical fiber contained in the conveyance cable 18 from the laser output sub 16. This may enable an operator at the surface to monitor the operations undertaken by the laser output sub 16. In addition, such an imaging device may also enable the analysis of the well fluid 30, the casing 26, and/or the formation 22 in the wellbore 20. With or without such an imaging device, the laser output sub 16 may also be used to clean the interior of the wellbore 20 of certain imperfections by blasting or vaporizing them.

The control circuitry 14 of the surface laser generator 12 may control the surface laser generator 12 and/or the laser output sub 16. For instance, the control circuitry 14 may control the timing and power of the laser pulses generated by the surface laser generator 12. Additionally or alternatively, the control circuitry 14 may control the laser output sub 16 to dispense optical grease and/or magnetic fluid and/or to generate vacuum cavitation bubbles.

The control circuitry 14 may thus include any suitable logic circuitry. In one example, the control circuitry 14 may include a processor and volatile or nonvolatile memory. The processor may carry out instructions encoded on the volatile or nonvolatile storage. By way of example, the volatile or nonvolatile storage may represent any suitable article of manufacture including, for example, read only memory (ROM), random access memory (RAM), flash memory, optical storage, and/or a hard disk drive.

The surface laser generator 12 of the laser heating system 10 may produce laser pulses that can travel a great distance along the optical fibers contained in the conveyance cable 18 (e.g., up to thousands of meters in distance). Even so, at great distances, the laser pulses may attenuate beyond an acceptable amount before reaching the laser output sub 16. This potential limitation may be addressed by a laser heating system 40 shown in FIG. 2. The laser heating system 40 includes a spooling and/or power device 42 that does not necessarily generate laser pulses at the surface of the wellsite. The spooling and/or power device 42, which may include control circuitry 44 similar to the control circuitry 14, may instead provide support and power to a downhole laser generation sub (GEN) 46. This laser generation sub 46 may generate the laser pulses for the laser output sub 16, potentially enabling the laser output sub 16 to perform laser heating operations at depths beyond those possible using surface laser generation alone.

The spooling and/or power device 42 at the surface may provide power and/or control signals over a conveyance cable 48 to the laser generation sub 46. The laser generation sub 46 may generate laser pulses that can be provided over an optical fiber or bundles of optical fibers contained within a conveyance cable 50 to the laser output sub 16. Because the downhole laser generation sub 46 uses the conveyance cable 50 to provide the laser pulses to the laser output sub 16, the conveyance cable 48 may not necessarily include any optical fibers. Indeed, in some embodiments, the conveyance cable 48 may be a standard electrical logging cable. In additional or alternative embodiments, however, the conveyance cable 48 may include an optical fiber or bundle of optical fibers to convey power or data (e.g., control signals or images from an imaging device of the laser output sub 16 or the laser generation sub 46).

The laser generation sub 46 may represent any suitable sub, including a cartridge-type sub positioned some distance from the laser output sub 16. In some embodiments, the laser generation sub 46 may be approximately 5 meters, 10 meters, 20 meters, 100 meters, or any other suitable distance from the laser output sub 16. In one embodiment, an array of laser diodes in the laser generation sub 46 may generate the laser pulses for the laser output sub 16 relatively efficiently. In other embodiments, one or two lasers (e.g., Ytterbium lasers) may be located in the laser generation sub 46. As in the example of FIG. 1, the laser heating system 40 of FIG. 2 may be used to weld, cut, and/or perforate materials in the wellbore 20. For example, the laser output sub 16 may be used to weld a seal 28 over perforations 24 in the casing 26.

Figure 3:
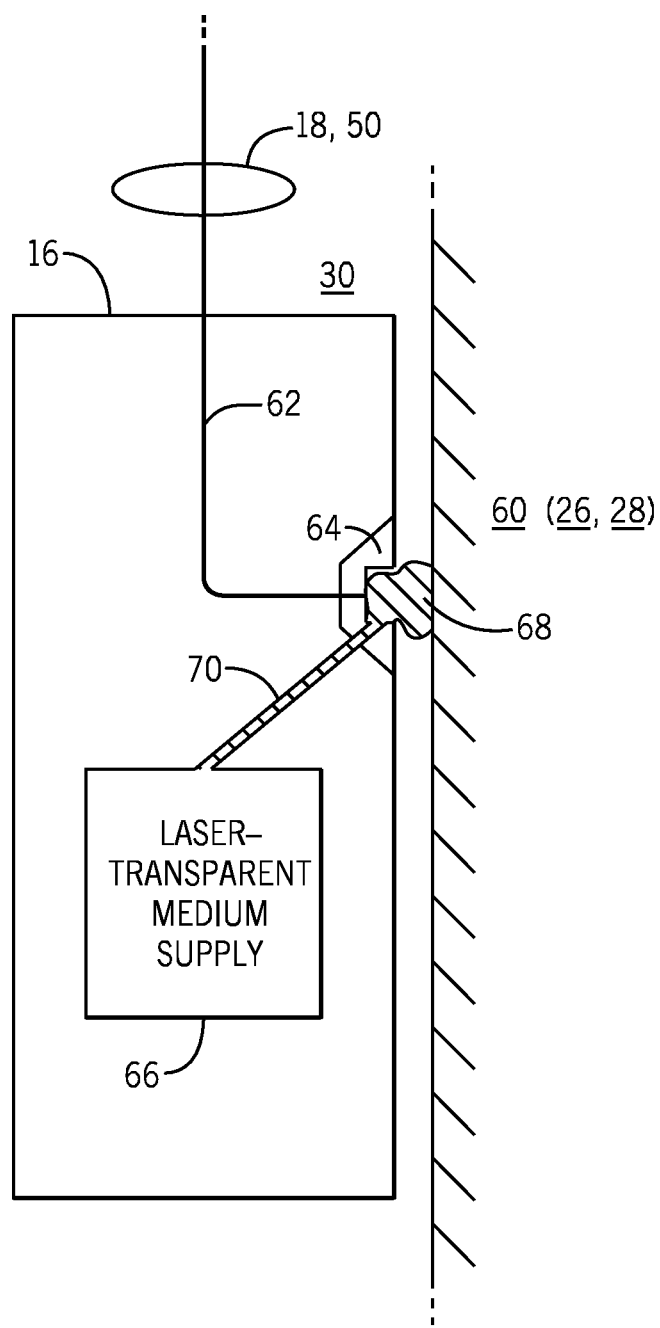
FIG. 3 is a block diagram of a laser output sub that uses a laser-transmissive medium to enable a laser pulse to heat a substrate in a fluid environment, in accordance with an embodiment.

Whether the laser pulses for the laser output sub 16 are generated at the surface (e.g., by a surface laser generator 12 as in FIG. 1) or downhole (e.g., by a laser generation sub 46 as in FIG. 2), the laser output sub 16 may employ a variety of possible ways to displace the well fluid 30 between the output of the laser output sub 16 and its target substrate 60 (e.g., the casing 26 and/or the seal 28). In an example shown in FIG. 3, the laser output sub 16 is adjacent to the substrate 60 and suspended by the conveyance cable 18 or 50, depending on whether the laser output sub 16 is supplied by the surface laser generator 12 or the downhole laser generation sub 46. The conveyance cable 18 or 50 may contain an optical fiber or bundle of optical fibers 62, which may terminate at an optical interface 64. The optical interface 64 may be any suitable material used to connect the optical fiber or bundle of optical fibers 62 to the output of the laser from the laser output sub 16. The optical interface 64 may include coolers or a heat sink. Such passive devices may circulate well fluid 30 through the laser output sub 16 to prevent the laser output sub 16 from overheating. Thus, any suitable material with good thermal conductance may be employed. A laser-transmissive medium supply 66 may provide a laser-transparent or laser-transmissive medium 68 through an outlet 70 to the optical interface 64. In this disclosure, the area between optical interface 64 and the substrate 60 where the laser-transmissive medium 68 is injected may be referred to as a "fluid displacement area." A laser pulse may travel from the optical fiber or bundle of optical fibers 62 through the laser-transmissive medium 68 in the fluid displacement area to heat the substrate 60.

Figure 4B:
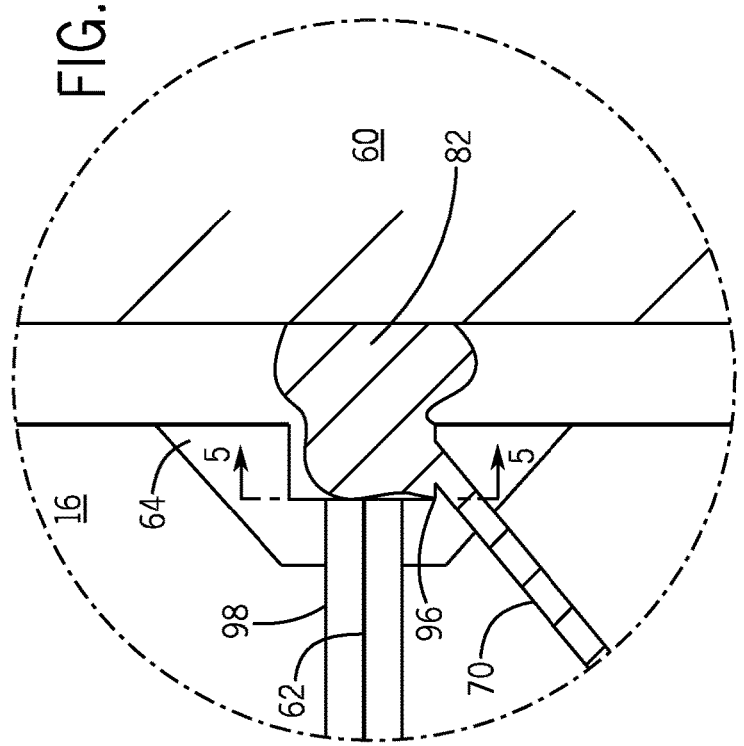
FIG. 4 is a block diagram of a laser output sub that uses an optical grease as a laser-transmissive medium, in accordance with an embodiment.
Figure 4A:
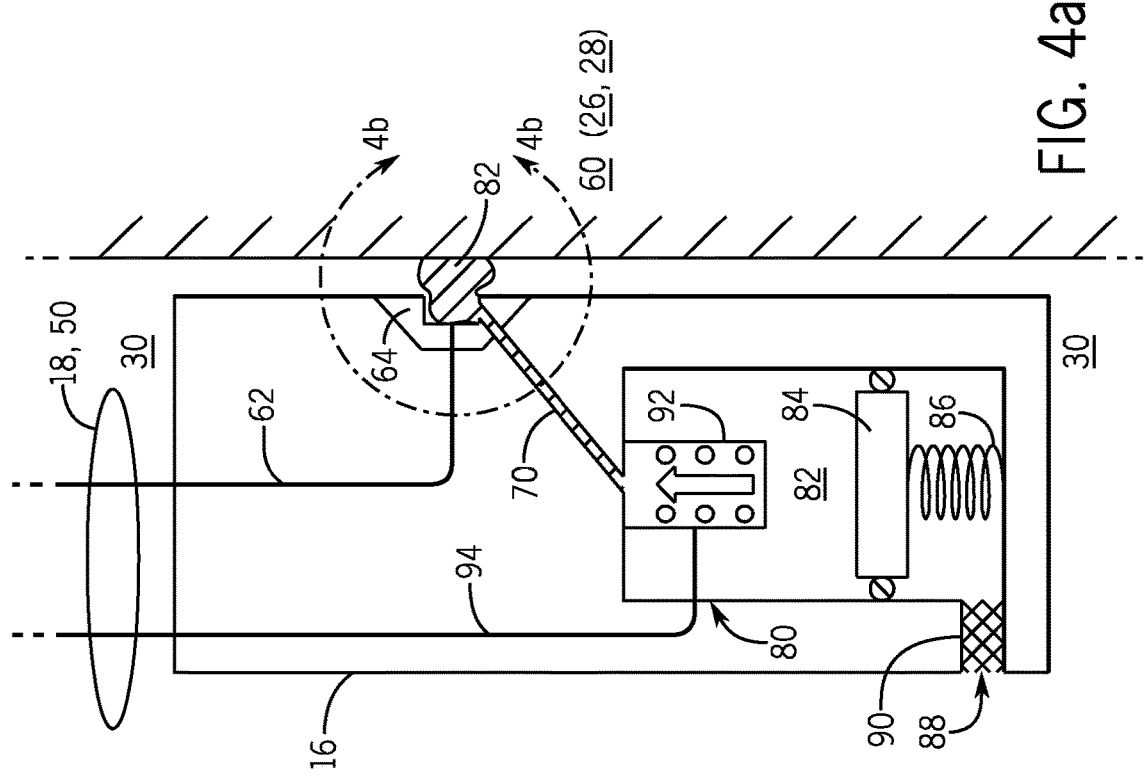

In one example, shown in FIG. 4a, the laser-transmissive medium supply 66 of the laser output sub 16 may be an optical grease dispenser 80 that dispenses an optical grease 82 through the outlet 70 at the optical interface 64. The optical grease dispenser 80 may include, for example, a piston 84 impressed upon by a coiled spring 86. The piston 84 may maintain the optical grease 82 at a positive pressure (e.g., of around 2 bar overbalance) versus the well fluid 30 to avoid contamination. A filling plug 88 with a mechanical filter 90 may enable the optical grease 82 to be filled at the surface. The optical grease 82 may be filled using the same techniques used in filling hydraulic oil filling systems, namely, by generating a vacuum to remove residual dissolved gasses before filling the reservoir through the mechanical filter 90.

An electro-valve 92 having an electro-valve coil may dispense the optical grease 82 based on control signals from a control line 94. The control line 94 may convey the control signals from the control circuitry 14 of the surface laser generator 12, the control circuitry 44 of the spooling and power device 42, and/or the downhole laser generation sub 46. The dispensation of optical grease 82 may be controlled based on the number and duration of laser pulses onto the substrate 60 and/or the environmental conditions downhole (e.g., temperature and/or characteristics of the well fluid 30). Monitoring the number and duration of laser pulses may provide an indication of the volume of optical grease 82 that has been released and, accordingly, may provide a measure of the quantity of optical grease 82 still remaining in the laser output sub 16. The control line 94 may be contained in the conveyance cable 18 or 50 along with the optical fiber or bundle of optical fibers 62.

The optical grease 82 may be any suitable laser-transmissive grease. It is believed that the optical grease 82 may displace the well fluid 30 more effectively than certain other fluids, gels, or gases. During laser heating operations, the optical grease 82 may hold the optical coupling of the optical interface 64. The optical grease 82 may stick to the surface of the substrate 60 owing to its higher viscosity, even filling in gaps and irregularities of the substrate 60 in ways not possible with other fluids, gels, and gasses. In some embodiments, the optical grease 82 may be an optical grease manufactured by General Electric, Dow Chemical, or St. Gobain (e.g., BC-630 or BC-637).

FIG. 4b illustrates a closer view of the weld site of the substrate 60 at detail lines 4b-4b of FIG. 4a. This closer view illustrates the displacement of the well fluid 30 by the optical grease 82. The optical grease 82 may pass into a space in the optical interface 64 between the output of the optical fiber or bundle of optical fibers 62 and the substrate 60. The efficiency of the laser pulses may be increased by optimizing the dispensation and/or space in which the optical grease 82 is deposited so as to form a slab of the thinnest possible thickness. As also shown in FIG. 4b, the optical fiber or bundle of optical fibers 62, which transmits the laser pulse used to heat the substrate 60, may be contained, for example, within a metal tube 98. Although the metal tube 98 is not shown in other drawings of this disclosure, it should be understood that such a metal tube 98 may be employed with any of the other embodiments of this disclosure.

Figure 5:
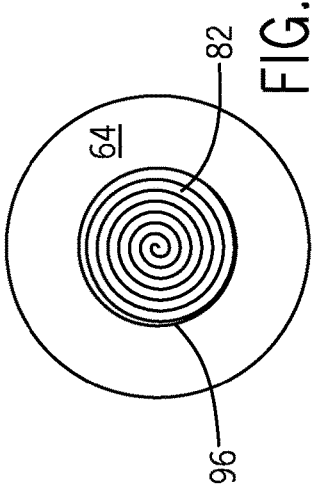
FIG. 5 is a schematic diagram showing the optical grease being dispensed in a spiral form at a laser output interface of the laser output sub of FIG. 4, in accordance with an embodiment.

In one embodiment, the optical grease 82 is output by the outlet 96 in a spiral pattern to form an optical slab through which the laser from the optical fiber or bundle of optical fibers 62 can pass. FIG. 5, which represents a cross-sectional view of the close-end view of FIG. 4a at cut lines 5-5, illustrates this phenomenon. The optical grease 82 may enter the space in the optical interface 64 through the outlet 96 at an angle. As a result, the optical grease 82 may form a spiral that may be more likely to remain in place for the duration of the laser pulse during welding, perforating, or cutting.

Figure 6:
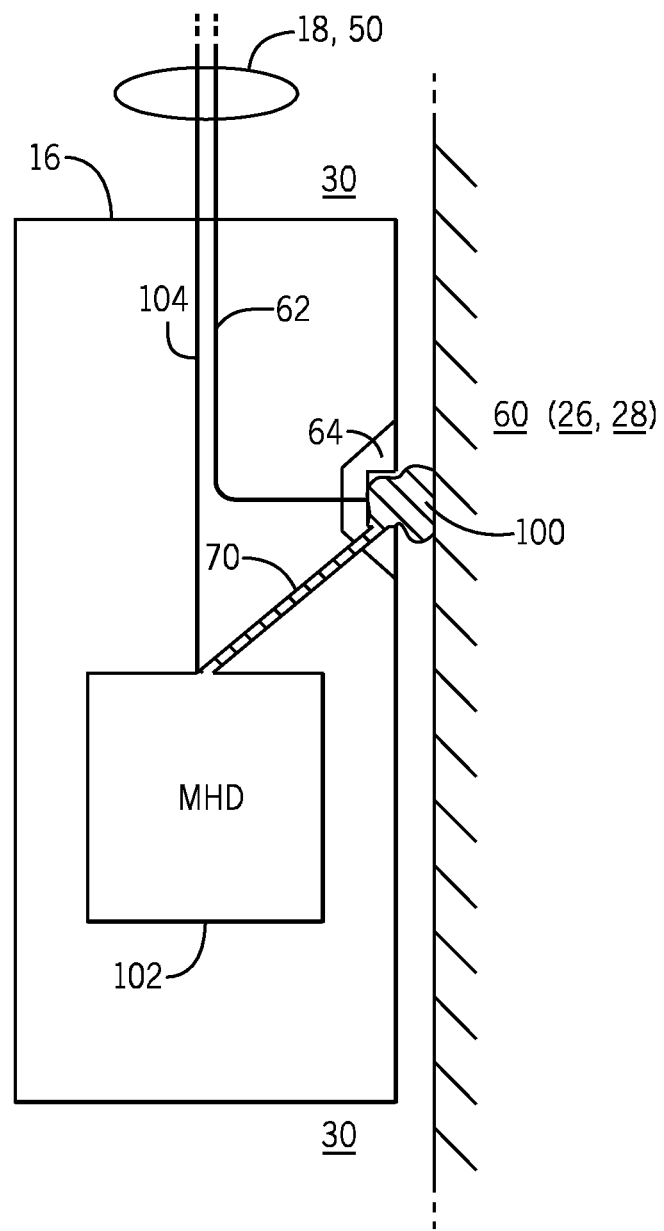
FIG. 6 is a block diagram of a laser output sub that uses a magnetic fluid as a laser-transmissive medium, in accordance with an embodiment.

Other materials may be used in addition or alternatively to the optical grease 82. For example, as shown in FIG. 6, the laser output sub 16 may use a laser-transmissive magnetic fluid 100, such as cadmium-ferrite, to exclude the well fluid 30 during laser heating operations. Any other suitable magnetic fluids generally light-transmissive to the wavelength of laser pulse may be employed. The magnetic fluid 100 may be attracted to metallic components of the laser output sub 16 and/or substrate 60. The magnetic fluid 100 thus may remain in place more effectively than other fluids, gels, and gasses that could be used to displace the well fluid 30.

A magnetohydrodynamic (MHD) pump 102 may convey the magnetic fluid 100 through the outlet 70 to the space between the optical interface 64 and the substrate 60. A control line 104 may control the MHD pump 102 to eject the magnetic fluid 100. Because the MHD pump 102 may have few or no moving parts, less maintenance may be performed for the MHD pump 102 than for other systems. The control line 104 may convey a control signal to control the MHD pump 102 from the control circuitry 14 of the surface laser generator 12, the control circuitry 44 of the spooling and power device 42, and/or the downhole laser generation sub 46. The conveyance cable 18 or 50 may contain the control line 104 along with the optical fiber or bundle of optical fibers 62.

The laser output sub 16 may use any other suitable laser-transparent or laser-transmissive medium to exclude the well fluid 30 and enable the laser pulse to reach the substrate 60. For example, the laser output sub 16 may inject a burst of laser-transmissive fluid or gas into the space between the optical interface 64 and the substrate 60.

In still other embodiments, the laser output sub 16 may not use any separate fluid displacement medium. Rather, the laser output sub 16 may generate vacuum cavitation bubbles 110 in the well fluid using any suitable cavitation source 112. A vacuum cavitation bubble 110 is formed when a burst of energy creates a temporary vacuum bubble in the well fluid 30. Thus, the laser output sub 16 may not inject gas bubbles of a separate medium into the well fluid 30, but may instead achieve a "bubble" of a short-lived vacuum within the well fluid 30. In fact, under most conditions, vacuum cavitation bubbles are phenomena that are to be avoided, owing to their sometimes-destructive nature. Here, however, the formation of vacuum cavitation bubbles 110 can be used to great advantage, allowing the laser pulse to travel from the optical interface 64 to the substrate 60 without being absorbed by the well fluid 30.

A control line 114 may be contained within the conveyance cable 18 or 50 and may transmit a control signal to the cavitation source 112. As in the examples above, the control signal may be provided by the control circuitry 14 of the surface laser generator 12, the control circuitry 44 of the spooling and power device 42, and/or the downhole laser generation sub 46. The control line 114 may control the precise amount of energy emitted by the cavitation source 112 to create a vacuum cavitation bubble 110 of appropriate size. If the vacuum cavitation bubble 110 is too large, the resulting release of energy when the vacuum cavitation bubble 110 collapses could damage the laser output sub 16 and/or the substrate 60. A vacuum cavitation bubble 110 that is too small, however, may not allow sufficient laser energy to pass through to the substrate 60.

In an example shown in FIG. 8, the laser output sub 16 may employ an ultrasonic device 120 to generate the vacuum cavitation bubbles 110. The ultrasonic device 120 may emit a pulse of ultrasonic energy through an outlet 122 into the well fluid 30 between the optical interface 64 and the substrate 60. The pulse of ultrasonic energy may produce a vacuum cavitation bubble 110.

In another example, shown in FIG. 9, the laser output sub 16 may use an arcing device 130 to generate the vacuum cavitation bubbles 110. Electrodes 132 and 134 may be located around the optical interface 64 (e.g., on opposite sides of the output of the optical fiber or bundle of optical fibers 62). The arcing device 130 may provide a differential voltage on the electrodes 132 and 134. When a sufficient voltage difference occurs on the electrodes 132 and 134, the resulting electrical arc 136 may inject enough energy into the well fluid 30 to generate the vacuum cavitation bubble 110. The arcing device 130, by controlling the amount of electrical power injected into the well fluid 30 in the electrical arc 136, may control the size of the vacuum cavitation bubble 110.

In some embodiments, a laser pulse may generate the vacuum cavitation bubbles 110, as will be described below with reference to FIGS. 10-14. In FIGS. 10-13, a cavitation-causing laser pulse is provided over a separate bundle of optical fibers 150 to generate the vacuum cavitation bubbles 110. In other embodiments, however, a cavitation-causing laser pulse may be provided over the optical fiber or bundle of optical fibers 62. In either case, the cavitation-causing laser pulse may produce the vacuum cavitation bubbles 110 before a heating laser pulse is emitted through the vacuum cavitation bubbles 110.

Figure 10:
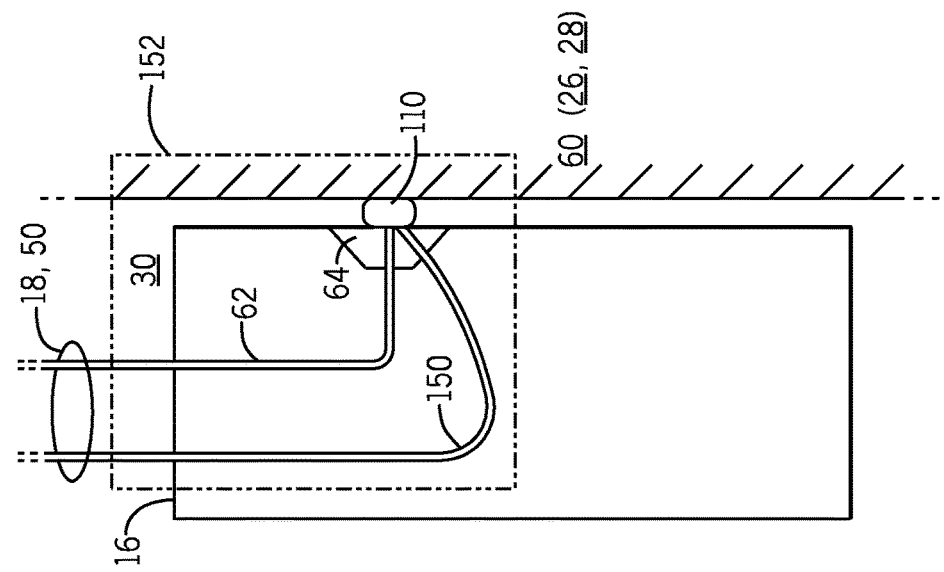
FIG. 10 is a schematic diagram of a laser output sub that employs a cavitation-causing laser pulse to generate a vacuum cavitation bubble, in accordance with an embodiment.

In the example of FIG. 10, optical fibers or bundles of optical fibers 62 and 150 may be contained in the conveyance cable 18 or 50 from which the laser output sub 16 is suspended. The optical fiber or bundle of optical fibers 150 may also be positioned to generate a vacuum cavitation bubble 110 that will reach its maximum size in front of the output of the optical fiber or bundle of optical fibers 62 between the optical interface 64 and the substrate 60. The same or different lasers or laser diodes may supply the laser pulses to the respective optical fiber or bundles of optical fibers 62 and 150. For example, the laser or laser diodes that supply heating laser pulse to the optical fiber or bundle of optical fibers 62 may provide a laser pulse of a duration and power sufficient to weld, cut, and/or perforate the substrate 60, but not necessarily to generate the vacuum cavitation bubble 110. The laser or laser diodes that supply the cavitation-causing laser pulse to the optical fiber or bundle of optical fibers 150, however, may supply a relatively short laser pulse with enough energy to generate the vacuum cavitation bubbles 110. In one example, the laser that supplies the cavitation-causing laser pulse is an ArF excimer laser.

Figure 11:
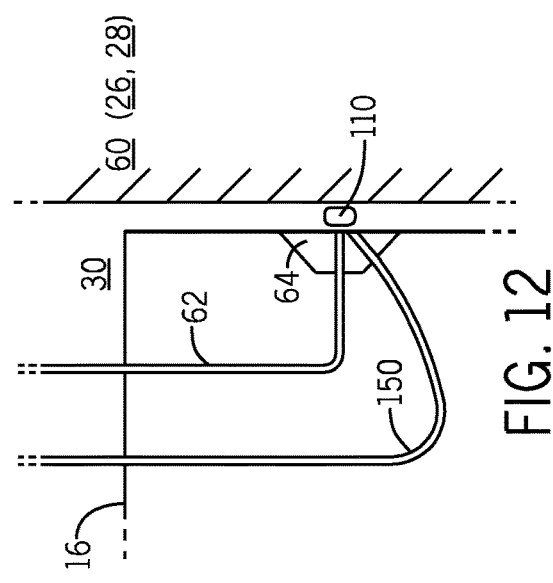
FIGS. 11-13 are schematic diagrams showing the generation of the vacuum cavitation bubble from the cavitation-causing laser pulse, in accordance with an embodiment.
Figure 12:
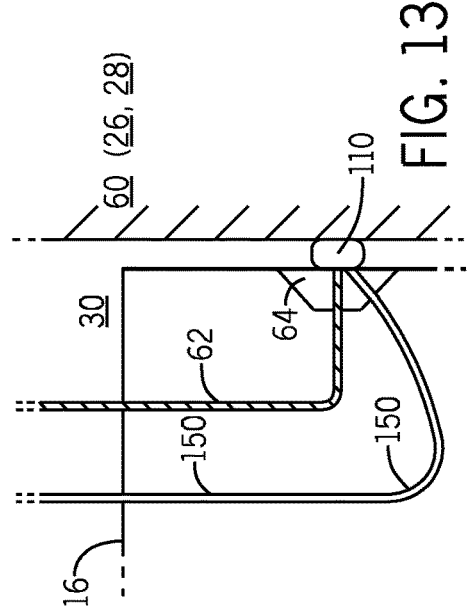
Figure 13:
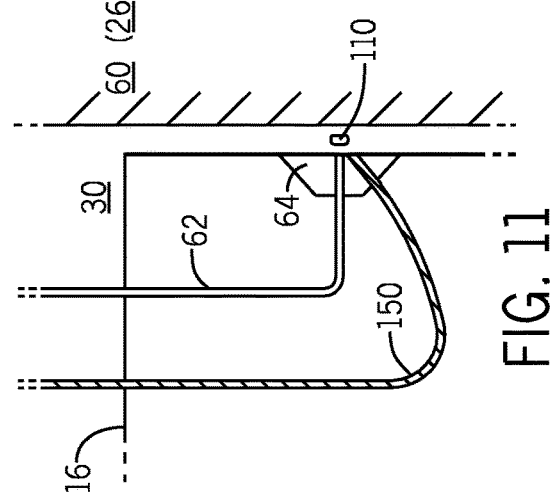

FIGS. 11-13 illustrate one manner in which the vacuum cavitation bubbles 110 may be generated using these cavitation-causing laser pulses. In FIG. 11, cavitation-causing laser pulse is provided over the optical fiber or bundle of optical fibers 150. This begins the formation of the vacuum cavitation bubble 110 in the well fluid 30. At this time, the heating laser pulse is not supplied over the optical fiber or bundle of optical fibers 62.

Thereafter, as seen in FIG. 12, the vacuum cavitation bubble 110 may expand. Neither the optical fiber or bundle of optical fibers 62 nor the optical fiber or bundle of optical fibers 150 may output a laser pulse while the vacuum cavitation pulse 110 is growing. When enough time has passed for the vacuum cavitation bubble 110 to be sufficiently large, as shown in FIG. 13, the optical fiber or bundle of optical fibers 62 may emit a heating laser pulse of a longer duration but lower power than the cavitation-causing laser pulse. These duration and power of the various laser pulses may be controlled by the control circuitry 14 of the surface laser generator 12, the control circuitry 44 of the spooling and power device 42, and/or the downhole laser generation sub 46.

Figure 14:
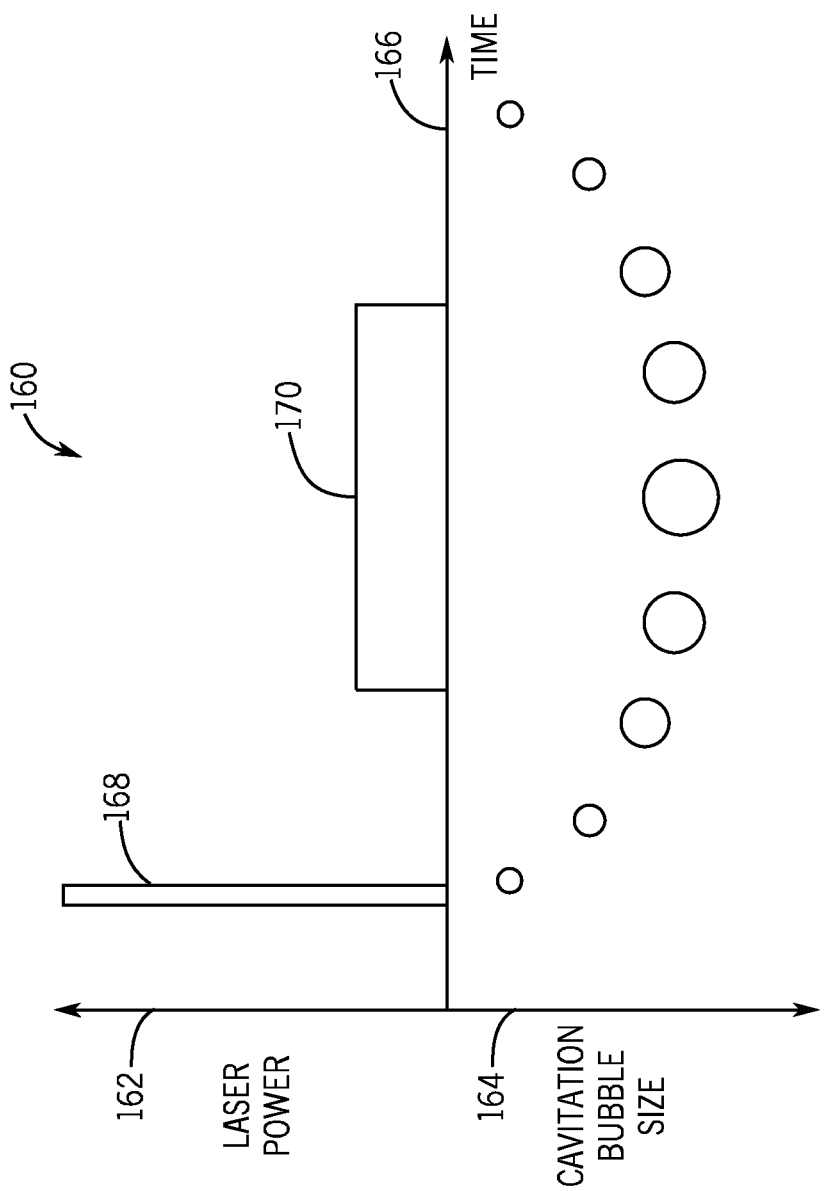
FIG. 14 is a timing diagram showing a cavitation-causing laser pulse and heating laser pulse, and the size of the vacuum cavitation bubble caused by the cavitation-causing laser pulse, in accordance with an embodiment.

A timing diagram 160 of FIG. 14 illustrates the sequence and behavior of the laser pulses, regardless of whether a single laser or two separate lasers are used to generate the cavitation-causing laser pulse and the heating laser pulse, respectively. In the timing diagram 160, a first ordinate 162 represents laser power, a second ordinate 164 represents the size of the vacuum cavitation bubble 110, and an abscissa 166 represents time. As seen in FIG. 14, a short, high-energy cavitation-causing laser pulse 168 may initialize the formation of the vacuum cavitation bubble 110. The cavitation-causing laser pulse 168 may be on the order of a between approximately 0.5-1000 femtoseconds. The energy of the cavitation-causing laser pulse 168 may be selected to sufficiently generate the cavitation bubble 100. Generating a cavitation bubble 100 may involve applying at least a minimum energy over a surface; it is generally admitted that a good starting point may be approximately 50 Watts per cm. Additional information regarding the formation of cavitation bubbles 100 may be found, for example, in the book *SONOCHEMISTRY AND CAVIATTION* by Milia A. Margulis (Gordon and Breach Publishers)—ISBN 2-88124-849-7.

As seen in the timing diagram 160, the vacuum cavitation bubble 110 may grow over time, before a longer, lower-energy heating laser pulse 170 is emitted. The duration of the heating laser pulse 170 may coincide with the duration of the maximum size of the vacuum cavitation bubble 110. In some embodiments, this duration may be between approximately 0.1-100 microseconds or longer. Some time after the laser pulse 170 has ended, the vacuum cavitation bubble 110 may collapse.

Figure 15:
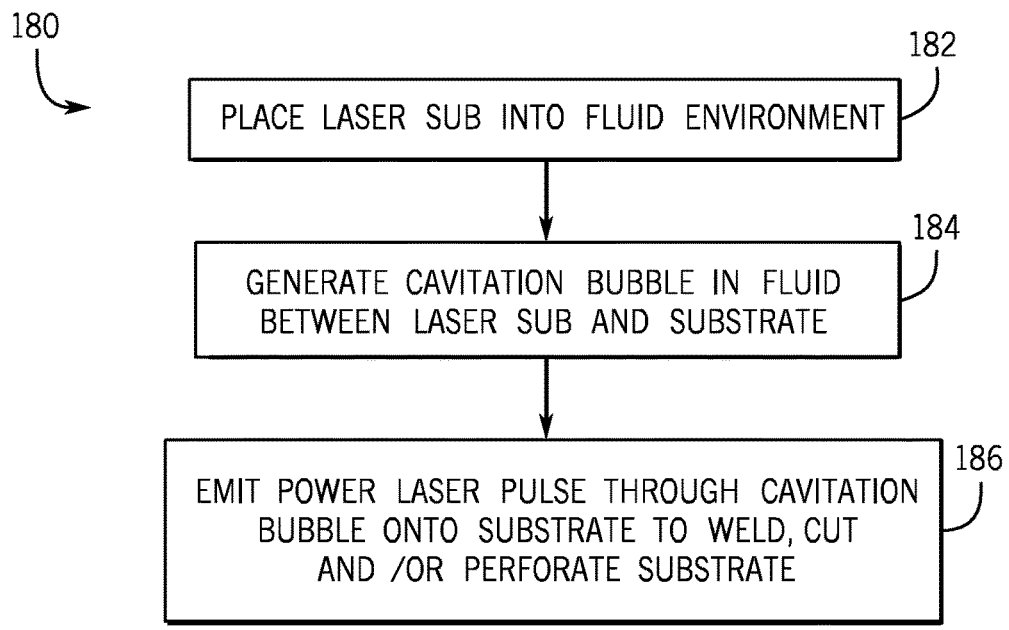
FIG. 15 is a flowchart of a method for performing a laser heating operation in a fluid environment using vacuum cavitation bubbles, in accordance with an embodiment.

In this way, the laser heating systems 10 and/or 40 may use the vacuum cavitation bubbles 110 to perform laser heating operations. Indeed, as shown by a flowchart 180 of FIG. 15, the laser output sub 16 and/or laser generation sub 46 may do so by being placed into a fluid environment (block 182). The fluid environment may arise, for example, in a wellbore 20 or a nuclear power plant. The laser output sub 16 may generate a vacuum cavitation bubble 110 between the laser output sub 16 and the substrate 60 using any suitable technique (block 184). The laser output sub 16 then may emit a heating laser pulse (e.g., the heating laser pulse 170) sufficient to operate on the substrate 60 (block 186). For example, the heating laser pulse (e.g., the heating laser pulse 170) may weld, cut, and/or perforate the substrate 60. In other embodiments, the heating laser pulse (e.g., the heating laser pulse 170) may, additionally or alternatively be used to clean or scrap the substrate, and/or to activate a material with heat (e.g., a shape memory alloy valve or device).

FIGS. 16 and 17 describe aspects of the laser output sub 16 that may or may not be present in any of the embodiments discussed above. In FIG. 16, the laser output sub 16 includes a welding metal or powder dispenser 190 controlled by a control line 192. A laser-transparent system 194 controlled by a control line 196 may represent, for example, a laser-transmissive medium supply 66 or a cavitation source 112. In some embodiments, the laser-transparent system 194 may not be present. The welding metal and/or powder dispenser 190 may extrude a metal or powder 198 to be impinged upon by the laser pulse emitted through the optical fiber or bundle of optical fibers 62. This may cause the welding metal or powder 198 to liquify and subsequently congeal on the substrate 60 to form a weld 200. In one example, the weld 200 may connect to separate components of the substrate 60, such as to join the seal 28 to the casing 26.

In FIG. 17, an optical fiber 210 may be provided along with the optical fiber or bundle of optical fibers 62 through the optical interface 64. The optical fiber 210 may operate as a lens to a fiber optical camera, transmitting image information to an imaging device located in the surface laser generator 12, spooling and power device 42, and/or laser generation sub 46. In this way, an operator may observe the operation of the laser output sub 16.

Figure 18:
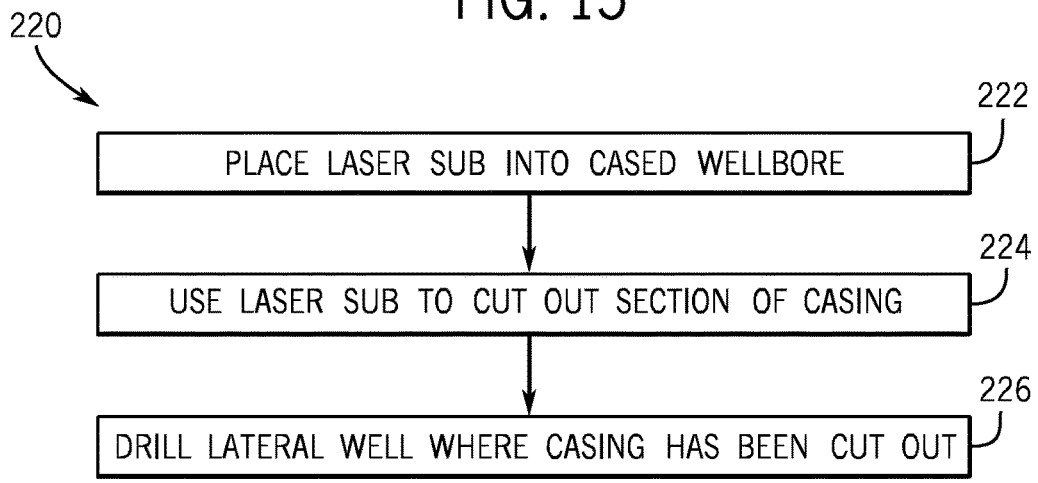
FIG. 18 is a flowchart of a method for drilling a lateral well with assistance from the laser heating system, in accordance with an embodiment.

The various embodiments described above may be used to perform a variety of operations. For example, as shown in a flowchart 220 of FIG. 18, the laser heating system 10 and/or 40 may assist in the drilling of a lateral well. The laser output sub 16 and/or laser generation sub 46 may be placed into the wellbore 20 (block 222). The laser output sub 16 may cut out a section of the casing 26 of the wellbore 20 (block 224). Thereafter, a drill bit may be placed into the area where the casing has been cut out, and a lateral well may be drilled (block 226). It is believed that this may reduce certain stresses on the drill bit, thereby extending its useful life.

Figure 19:
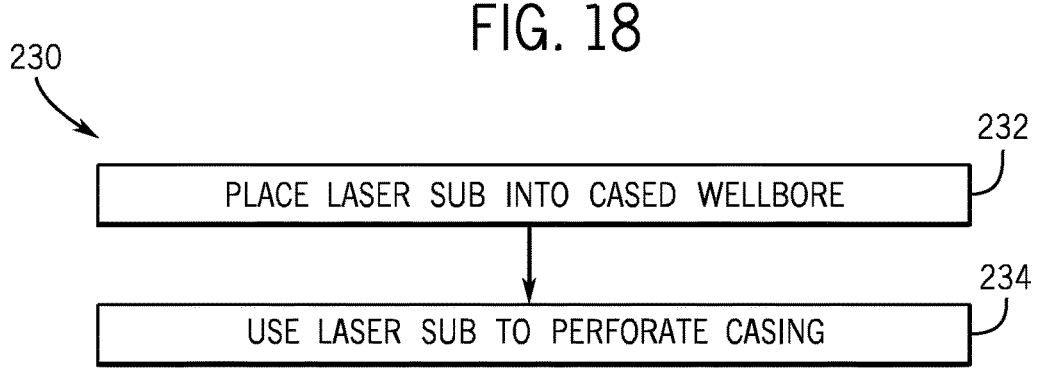
FIG. 19 is a flowchart for perforating a well to access an area of a formation surrounding a wellbore, in accordance with an embodiment.

Another example appears in a flowchart 230 of FIG. 19. The laser output sub 16 and/or the laser generation sub 46 may be placed into the wellbore 20 (block 232). The laser output sub 16 then may be used to perforate the wellbore 20 at a relatively precise depth to enable additional production without explosives (block 234).

Technical effects of the disclosure include controlling a laser output sub to perform laser heating operations in fluid and/or extreme environments. The laser output sub may exclude surrounding fluids, such as well fluids, using optical grease and/or magnetic fluid, which may be more likely than many other possible displacement fluids to remain in place. Additionally or alternatively, in some embodiments, the laser output sub may not merely inject a gas bubble into the well fluid, but rather may inject enough energy into the well fluid to generate a vacuum cavitation bubble. It may be noted that vacuum cavitation bubbles are normally phenomena to be avoided, owing to their sometimes-destructive nature. Here, however, vacuum cavitation bubbles may be used to great effect. Indeed, vacuum cavitation bubbles may allow the laser output sub to exclude the well fluid without any need to inject other material, such as gas bubbles or other fluid displacement media.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A system for laser heating in a fluid environment, the system comprising:
   a laser generator configured to generate a heating laser pulse over a first optical fiber; and
   a laser output sub connected to the laser generator via at least the first optical fiber, wherein the laser output device is configured to emit the heating laser pulse to heat a substrate in the fluid environment, and wherein, to enable the heating laser pulse to pass between the laser output sub and the substrate, the laser output sub is configured to:
   dispense a laser-transmissive optical grease;
   dispense a laser-transmissive magnetic fluid magnetically attracted to the laser output sub, the substrate, or both;
   generate a vacuum cavitation bubble in the fluid environment using an ultrasonic pulse from an ultrasonic device;
   generate a vacuum cavitation bubble in the fluid environment using an electrical arc from an electrical arcing device; or
   any combination thereof.

2. The system of claim 1, wherein the laser output sub, but not the laser generator, is configured to be submerged in the fluid environment.

3. The system of claim 2, wherein the laser generator is configured to operate at a surface location of a wellsite and the laser output sub is configured to operate in a well filled with a well fluid.

4. The system of claim 1, wherein both the laser output sub and the laser generator are configured to be submerged in the fluid environment.

5. The system of claim 4, wherein the laser generator is contained in a laser generation sub, and both the laser generation sub and the laser output sub are configured to be placed into a well filled with a well fluid, and wherein the laser generation sub is configured to receive power to generate the heating laser pulse from a power supply at a surface of the wellsite.

6. The system of claim 1, wherein the laser output sub is configured to dispense the optical grease in a spiral form to enable the optical grease to better remain in place while the heating laser pulse is emitted.

7. The system of claim 1, wherein laser output sub is configured to dispense the magnetic fluid using a magneto-hydrodynamic pump.

8. A method for laser heating in a fluid environment comprising:
   disposing a laser output sub into the fluid environment adjacent to a substrate;
   generating a vacuum cavitation bubble in the fluid environment between the laser output sub and the substrate using one of an electrical arc from an electrical arcing device and of an ultrasonic pulse from an ultrasonic device; and emitting a heating laser pulse from the laser output sub toward the substrate through the vacuum cavitation bubble to heat the substrate.

* * * * *